United States Patent [19]

Sbragia

[11] Patent Number: 4,953,878

[45] Date of Patent: Sep. 4, 1990

[54] COLLAPSIBLE CART

[76] Inventor: Frank J. Sbragia, Rt. 1, Box 2377 Checker Rd., Long Grove, Ill. 60047

[21] Appl. No.: 265,060

[22] Filed: Oct. 31, 1988

[51] Int. Cl.[5] .............................................. B62B 3/02
[52] U.S. Cl. ........................................ 280/30; 280/37; 280/648; 280/651
[58] Field of Search ................... 280/37, 42, 639, 640, 280/641, 651, 659, 643, 648, 30, 43, 43.24

[56] References Cited

U.S. PATENT DOCUMENTS

| | | | |
|---|---|---|---|
| 360,873 | 4/1887 | Furse | 280/42 |
| 541,760 | 6/1895 | Kellar | 280/42 |
| 611,675 | 10/1898 | Brookmeyer | 280/42 |
| 707,772 | 8/1902 | Green | 280/42 |
| 1,081,221 | 12/1913 | Durkin | 280/641 |
| 1,158,507 | 11/1915 | Kolb | 280/642 |
| 1,361,698 | 12/1920 | Eble | 280/37 |
| 1,683,029 | 9/1928 | Fanger | 280/651 |
| 1,693,633 | 12/1928 | Allen | 280/43 X |
| 1,715,865 | 6/1929 | Rosenfeld | 280/37 |
| 1,880,167 | 9/1932 | Baerulfsen | 280/42 |
| 2,407,385 | 9/1946 | Rubin et al. | 280/641 |
| 2,531,856 | 11/1950 | Marcouiller | 280/641 |
| 2,563,995 | 8/1951 | East | 280/639 |
| 2,575,189 | 11/1951 | Schmidt | 280/43 X |
| 2,780,474 | 2/1957 | Farah et al. | 280/641 |
| 2,812,188 | 11/1957 | Rusch | 280/641 |
| 2,843,391 | 7/1958 | Pelletier | 280/30 |
| 3,407,959 | 10/1968 | Mondineu | 280/651 |
| 3,701,541 | 10/1972 | Tarducci et al. | 280/37 |
| 3,931,985 | 1/1976 | Knebel | 280/42 |
| 4,523,768 | 6/1985 | Dlubala | 280/42 |
| 4,793,628 | 12/1988 | Haley, Sr. | 280/641 |

FOREIGN PATENT DOCUMENTS

| | | | |
|---|---|---|---|
| 256371 | 8/1967 | Austria | 280/42 |
| 2587290 | 3/1987 | France | 280/641 |
| 1342798 | 10/1987 | U.S.S.R. | 280/34 |
| 2051692 | 1/1981 | United Kingdom | 280/42 |
| 2180199 | 3/1987 | United Kingdom | 280/651 |

*Primary Examiner*—Charles A. Marmor
*Assistant Examiner*—Brian L. Johnson
*Attorney, Agent, or Firm*—Welsh & Katz, Ltd.

[57] ABSTRACT

A portable collapsible cart for use in self-service stores for carrying groceries, hardware and the like is disclosed. The cart has an upper compartment area and a lower planar area. The end walls of the upper compartment area and the lower planar area may be folded to permit the cart to be collapsed for easy transportability.

5 Claims, 2 Drawing Sheets

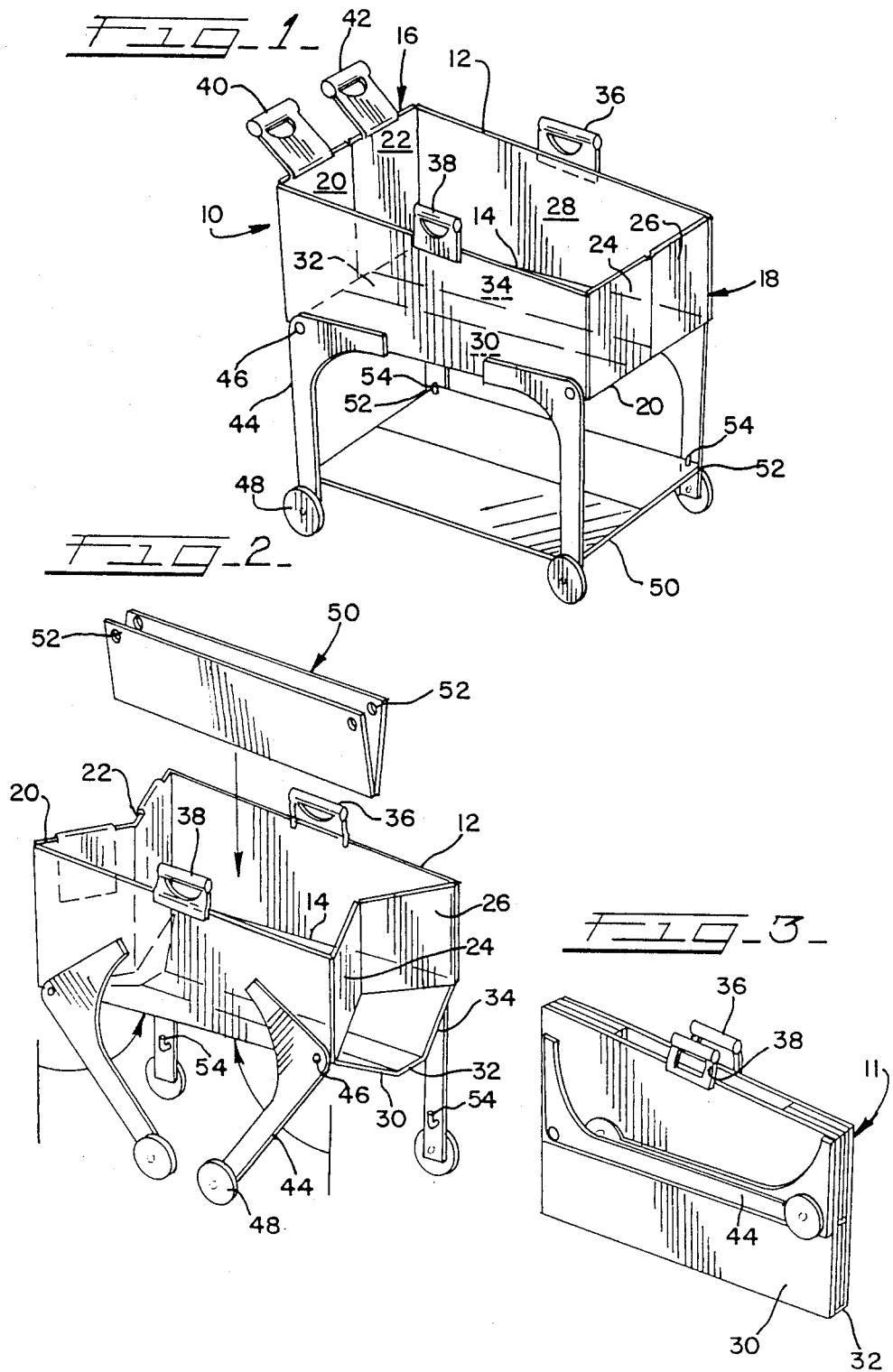

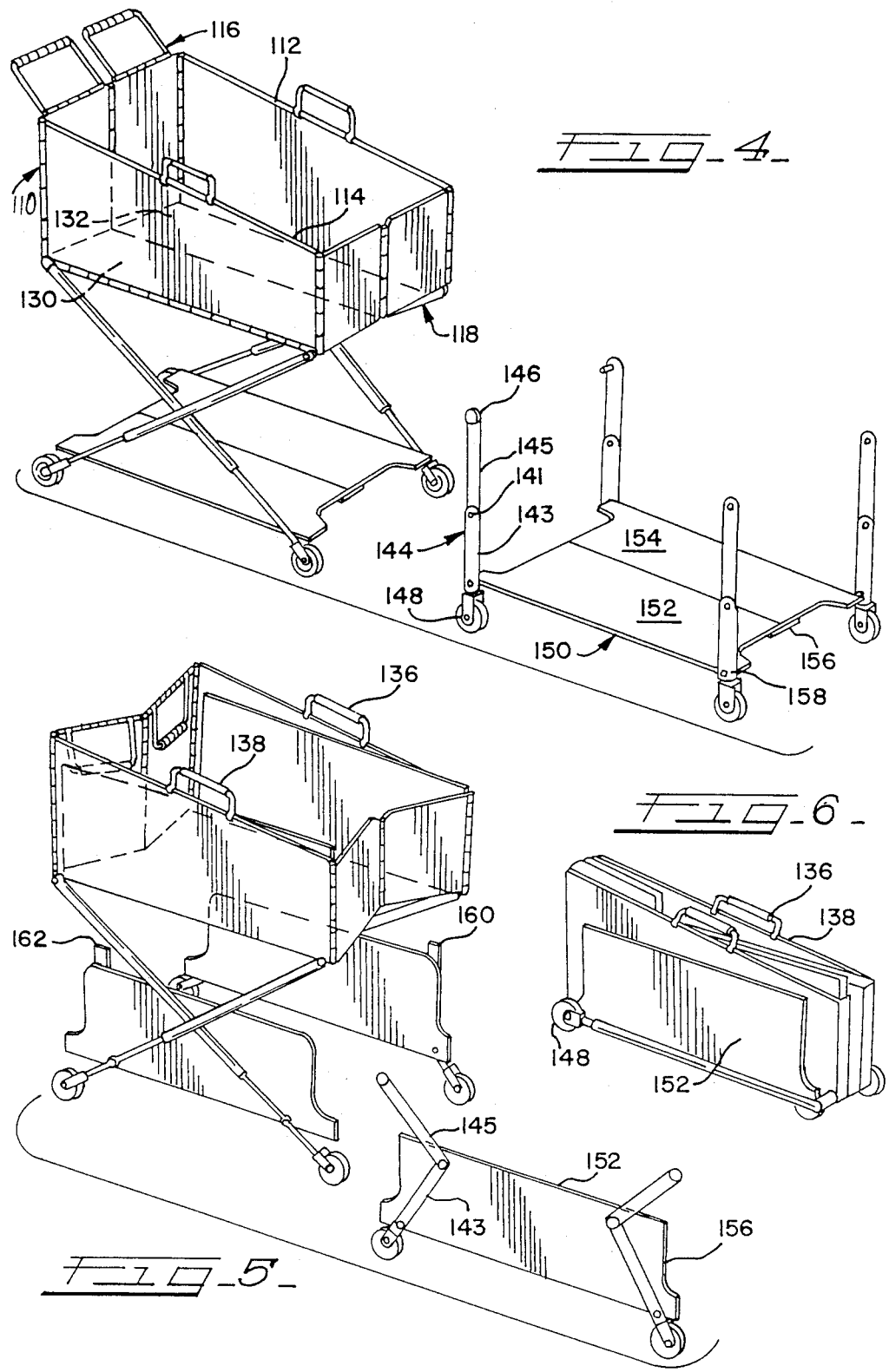

COLLAPSIBLE CART

BACKGROUND OF THE INVENTION

This invention pertains to portable carts and more particularly, to a collapsible wheeled cart for use in connection with the transport of items in a retail store.

Wheeled trays or carts are customarily employed in self-service stores, such as supermarkets or hardware stores, and generally have provision for a basket portion and a lower tray portion. In general such carts are of a sturdy, rigid and permanent construction; these carts are generally stable, being mounted on four caster wheels. Two-wheeled carts have also been used but with a reduced carrying capacity.

An object of the subject invention is a strong, stable cart which can be collapsed and easily carried when not in use.

Another object of the subject invention is an easily maneuverable grocery cart which has two load carrying areas and may be collapsed into a convenient, easy to carry bundle.

These and other objects are attained in accordance with the subject invention which relates primarily to a four-wheeled cart for use primarily in shopping. The cart is capable of being folded for a substantial reduction in size and shape for storage and/or carrying similar to a handbag. When assembled to its full size and shape, the cart of the subject invention is stable, capable of carrying heavy loads, and provides two areas for carrying such loads, one enclosed by four basket walls and another flat surface underneath the basket for use as a secondary load carrying area.

These and other features and objects will be seen in the following specification and claims in conjunction with the appended drawings.

BRIEF DESCRIPTION OF THE DRAWINGS

FIG. 1 is a front perspective view of a collapsible cart accordingly to the subject invention.

FIG. 2 is a front perspective view of a partially collapsed cart of FIG. 1 of the subject invention.

FIG. 3 is a perspective view of the cart of FIG. 1 in a collapsed state.

FIG. 4 is a front perspective view of another embodiment of the cart of the subject invention.

FIG. 5 is a perspective view showing a partially collapsed cart of FIG. 4.

FIG. 6 is a perspective view of the cart of FIG. 4 in a collapsed state.

DETAIL DESCRIPTION OF THE EMBODIMENT

Referring now to FIG. 1, there is shown a cart 10 having opposing side walls 12 and 14 which, together with end walls 16 and 18 and bottom wall 20 form an upper body portion or basket enclosure for the carrying of merchandise items, such as groceries, hardware or the like. The respective walls 12, 14, 16, 18, and 20 may be of a wire mesh, a fabric such as canvas secured about a rigid framework, or other self-supporting structure.

End wall 16 is divided into end panels 20 and 22 which are hingedly secured to each other and to side walls 12 and 14. End wall 18 similarly is bifurcated into end panels 24 and 26 which are hingedly secured to each other and to side walls 12 and 14. Side walls 12 and 14, combine with end walls 16 and 18 and bottom panel 20 to form carrying compartment 28. Bottom panel 20 comprises three adjacent panels 30, 32, and 34, each hingedly secured to the adjacent panel with end panels 30 and 34 being hingedly secured to the respective adjacent side walls 12 and 14.

Handles 36 and 38 are secured to opposing side walls 12 and 14, respectively. Handles 40 and 42 are also secured to adjacent end panels 20 and 22, respectively; each handle is pivotally secured to the respective end panel, so that it may be swung down into a inoperative position from an operative position. The handle may be locked into the operative position by appropriate ball and detent means, or the like.

Legs 44 support the basket enclosure in a standing position. Each leg 44 may be pivotally secured by a pin 46 to a respective lower corner of one of the side panels 12 and 14 for pivotable movement about pin 46. Caster wheels 48 secured to the lower ends of each of the legs 44 provide for easy portability of the cart 10. Lower panel 50 is hinged in the middle and has corner openings 52 for engagement with pins 54 and support of the panel. With this arrangement, lower surface is provided for additional carrying capacity.

In operation and fully assembled, a user pushes the cart forward with the application of a forward motion to the cart through handles 40 and 42. When not in use, the cart may be folded to the form shown in FIG. 3 by first removing lower panel 50 from pegs 54 and folding in half. The folded lower panel 50 is then inserted into the upper compartment 28. Upper compartment 28 is flattened by folding end panels 16 and 18 and compressing side panels 12 and 14 together; this was the effect of folding lower panels 30 and 34 downwardly to a vertical position, as shown in FIG. 2. Lower panel 50 may rest on lower panel 32. Legs 44 are pivoted upwardly and toward one another, thereby assuming the position shown in FIG. 3. In the folded position, handles 36 and 38 are drawn towards one another, forming a double handle by which the entire folded assembly may be easily picked up and transported.

In another embodiment, the cart of the subject invention has a upper merchandise carrying compartment 110 with side walls 112 and 114 and end walls 116 and 118 mounted on legs 144. Bottom panels 130 and 132 open in the center and swing upward to a vertical position, being hinged to the adjacent side panel. Legs 144 are pivotally mounted to the upper carrying portion 110 at 146. Each leg 144 comprises two sections, 143 and 145, pivotally joined at 141. At the lower end of lower leg section 143 is a wheel 148.

Hingedly secured to the legs at each of its four corners 158 is rectangular lower panel 150. Lower panel 150 comprises two separate lower panel portions 152 and 154. Each lower panel portion 152 and 154, being hingedly secured to the legs at 158, may swing up to a vertical position adjacent the legs 144. When swung down to a horizontal position, tabs 160 and 162 engage the opposite panel portion to prevent further downward movement.

Cut out portion 156 in each of the lower side panels 152 and 154 provide sufficient clearance to permit the lower panels 152 and 154 to be swung to the vertical position and the leg sections 143 and 145 to be collapsed inwardly and retracted upwardly. When retracting the legs 144 upwardly, the bottom panel of the upper compartment is opened by swinging the bottom panels 130 and 132 upwardly to a vertical position. The bifurcated end walls 116 and 118 are each pivoted inwardly and the side walls are pulled toward one another to place the handles side by side as shown in FIG. 6.

With the legs retracted and the carrying compartment collapsed, as shown in either of FIG. 3 or FIG. 6, the cart of the subject invention may be easily carried in the manner of a suitcase or briefcase.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. A unitary collapsible cart comprising an upper body portion, a lower planar surface and legs for supporting said upper body portion; said upper body portion defining an upper compartment, said upper compartment having opposing side walls, foldable end walls hingedly secured to said side walls and a foldable bottom having a first and a second panel, each of said first and second panels hingedly attached to one of said side walls, and a third panel attached to each of said first and second panels in a hinged manner so that said bottom can be folded into a tri-fold shape, said legs being pivotably secured to said upper body portion to permit the folding of said legs to a position adjacent said upper body portion; said lower planar surface being removably secured to each of said legs and having at least two planar panels hingedly attached along a longitudinal axis; said legs and said cart being held in an unfolded, open position by said lower planar surface, removal of said lower planar surface permits the cart to be collapsed into a compact rectangular shape.

2. The collapsible unitary cart of claim 1 wherein said lower planar surface is removably secured to each of said legs by a hook on each leg secured in a corresponding opening in a corner of said lower planar surface.

3. The collapsible cart of claim 1 further including a pair of handles mounted on one of said end walls.

4. A collapsible cart of claim 1 further including a handle mounted on each of said side walls, whereby on collapsing into said compact rectangular shape, said handles are drawn together for grasping by one hand of a person.

5. The collapsible cart of claim 1 further comprising a wheel located on a lowermost end of each leg.

* * * * *